(12) United States Patent
Cudak et al.

(10) Patent No.: US 10,310,957 B2
(45) Date of Patent: Jun. 4, 2019

(54) INDICATING AN APPLICATION STATUS BASED ON A DEVICE STATE

(71) Applicant: LENOVO Enterprise Solutions (Singapore) PTE. LTD., New Tech Park (SG)

(72) Inventors: Gary D. Cudak, Wake Forest, NC (US); Nathan J. Peterson, Durham, NC (US); Gavin D. Cudak, Wake Forest, NC (US); Caleb D. Cudak, Wake Forest, NC (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 161 days.

(21) Appl. No.: 15/153,146

(22) Filed: May 12, 2016

(65) Prior Publication Data

US 2017/0329690 A1 Nov. 16, 2017

(51) Int. Cl.
*G06F 11/34* (2006.01)
*G06F 9/50* (2006.01)
*G06F 11/30* (2006.01)

(52) U.S. Cl.
CPC ........ *G06F 11/3409* (2013.01); *G06F 9/5011* (2013.01); *G06F 11/302* (2013.01); *G06F 11/34* (2013.01)

(58) Field of Classification Search
CPC ... G06F 11/3409; G06F 9/5011; G06F 11/302
See application file for complete search history.

(56) References Cited

U.S. PATENT DOCUMENTS

| | | | | |
|---|---|---|---|---|
| 8,954,584 | B1* | 2/2015 | Subbarayan | H04L 47/765 709/201 |
| 9,183,059 | B1* | 11/2015 | Fausak | G06F 9/5077 |
| 2001/0039581 | A1* | 11/2001 | Deng | G06F 9/5044 709/226 |
| 2003/0065705 | A1* | 4/2003 | Santos-Gomez | G06F 3/0482 718/107 |
| 2003/0217092 | A1* | 11/2003 | Veselov | G06F 9/52 718/106 |
| 2015/0355992 | A1* | 12/2015 | Kolegayev | G06F 11/3433 718/104 |
| 2017/0277553 | A1* | 9/2017 | Zada | G06F 9/45558 |

OTHER PUBLICATIONS

Medium Corporation, Principles of good offline design, User Experience Design (UX), https://medium.com/user-experience-design-1/offline-93c2f8396124#.74u9zr5pq, Last visited Mar. 22, 2016.

* cited by examiner

*Primary Examiner* — Camquy Truong
(74) *Attorney, Agent, or Firm* — Kunzler Bean & Adamson; Bruce R. Needham

(57) ABSTRACT

Apparatuses, systems, methods, and program products are disclosed for indicating an application status based on a device state. An application module determines one or more device resources of a device that an application uses while executing on the device. A device module determines a performance state of each of one or more device resources of a device. An indicator module provides a visual indication of a potential execution level of an application on a display of a device. The potential execution level describes a projected level of functionality of an application as a function of a performance state of one or more device resources of the device.

15 Claims, 6 Drawing Sheets

INDICATING AN APPLICATION STATUS BASED ON A DEVICE STATE

FIELD OF THE INVENTION

The subject matter disclosed herein relates to using application functionality on a device, and more particularly relates to visually indicating a potential execution level of an application on a device.

BACKGROUND

A state of a device can vary. For instance, a network may be unavailable due to a device being out of range of a wireless access point. Similarly, a network connection may be limited due to the network hardware being used and the type of network a device is connected to. Performance levels may also fluctuate throughout device usage, for example, due to background processes or other activities. Often, a user is not aware of the state of the device, and whether it will affect the performance or functionality of an application, until after the user attempts to execute the application.

BRIEF SUMMARY

An apparatus for indicating an application status based on a device state is disclosed. A method and computer program product also perform the functions of the apparatus. In one embodiment, an application module determines one or more device resources that an application uses while executing on a device. In some embodiments, a device module determines a performance state of each of one or more device resources of a device. In a further embodiment, an indicator module provides a visual indication of a potential execution level of an application on a display of a device. A potential execution level may describe a projected level of functionality of an application as a function of a performance state of one or more device resources.

In one embodiment, a device module determines one or more performance metrics for each of one or more device resources of a device. A performance metric may describe a current utilization of a device resource on a device. In some embodiments, an application module determines one or more application execution metrics for each device resource used by an application. An application execution metric may describe a utilization of a device resource by an application while the application executes on a device.

In one embodiment, an apparatus includes an execution module that determines a potential execution level of an application by comparing one or more performance metrics for each of one or more device resources of a device to one or more application execution metrics of the application to determine whether a device resource is available for use by the application. In certain embodiments, an execution module determines a potential execution level of an application prior to the application being executed on a device.

In one embodiment, an apparatus includes an update module that periodically determines whether a potential execution level of an application has changed. In some embodiments, an update module determines one or more new performance metrics for each of one or more device resources of a device. An update module, in a further embodiment, determines one or more new application execution metrics for each device resource used by an application. An update module, in one embodiment, compares one or more new performance metrics for each of one or more device resources to one or more application execution metrics of an application to determine whether a potential execution level is different from a previously determined potential execution level.

In certain embodiment, an application module determines one or more application execution metrics by monitoring and tracking, for a period of time, one or more application execution metrics for a currently executing instance of an application on a device. In certain embodiments, an application module determines one or more application execution metrics by checking a file that includes the one or more application execution metrics. A file may be one of a manifest file associated with an application that is created by an owner or a developer of an application.

In some embodiments, an application module determines one or more application execution metrics by checking an execution history of an application. An execution history may include one or more application execution metrics from previously executed instances of an application. In some embodiments, one or more application execution metrics of an application include one or more of a battery consumption rate, a network utilization, a processor utilization, a memory utilization, and a storage utilization.

In one embodiment, one or more performance metrics of a device include one or more of a battery level, a network utilization, a processor utilization, a memory utilization, and a storage utilization. In some embodiments, an indicator module selects a plurality of visual indications for an application that correspond to a level of availability of each device resource used by the application such that each of the plurality of visual indications are displayed simultaneously on a display of a device.

In one embodiment, providing a visual indication comprises one or more of hiding a graphical icon representing an application in response to a potential execution level satisfying a low-functionality threshold; presenting a graphical icon representing the application that is not selectable in response to the potential execution level satisfying the low-functionality threshold; setting a color of a border of a graphical icon representing the application as a function of the potential execution level of the application; setting a transparency level of a graphical icon representing the application based on the potential execution level of the application; and presenting a tooltip associated with a graphical icon representing the application that includes information describing the potential execution level of the application.

A method, in one embodiment, includes determining, by use of a processor, one or more device resources that an application uses while executing on a device. A method, in some embodiments, includes determining a performance state of each of one or more device resources of a device. In some embodiments, a method includes providing a visual indication of a potential execution level of an application on a display of a device. The potential execution level may describe a projected level of functionality of an application as a function of a performance state of one or more device resources.

A method, in certain embodiments, includes determining one or more performance metrics for each of one or more device resources of a device. A performance metric may describe a current utilization of a device resource on a device. In some embodiments, a method includes determining one or more application execution metrics for each device resource used by an application. An application execution metric may describe a utilization of a device resource by an application while the application executes on a device.

In certain embodiments, a method includes determining a potential execution level of an application by comparing one or more performance metrics for each device resource of a device to one or more application execution metrics of an application to determine whether a device resource is available for use by the application. In one embodiment, a method includes determining one or more application execution metrics by monitoring and tracking, for a period of time, one or more application execution metrics for a currently executing instance of an application on a device.

A method, in one embodiment, includes determining one or more application execution metrics by checking a file that includes the one or more application execution metrics. A file may include a manifest file associated with an application that is created by one or more of an owner and a developer of the application. A method, in some embodiments, includes determining one or more application execution metrics by checking an execution history of an application. An execution history may include one or more application execution metrics from previously executed instances of an application.

In one embodiment, providing a visual indication comprises one or more of hiding a graphical icon representing an application in response to a potential execution level satisfying a low-functionality threshold; presenting a graphical icon representing the application that is not selectable in response to the potential execution level satisfying the low-functionality threshold; setting a color of a border of a graphical icon representing the application as a function of the potential execution level of the application; setting a transparency level of a graphical icon representing the application based on the potential execution level of the application; and presenting a tooltip associated with a graphical icon representing the application that includes information describing the potential execution level of the application.

A program product, in one embodiment, includes a computer readable storage medium that stores code executable by a processor. The executable code, in one embodiment, includes code to perform determining, by use of a processor, one or more device resources that an application uses while executing on a device. The executable code, in various embodiments, includes code to perform determining a performance state of each of one or more device resources of a device. The executable code, in a further embodiment, includes code to perform providing a visual indication of a potential execution level of an application on a display of a device. The potential execution level may describe a projected level of functionality of an application as a function of a performance state of one or more device resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
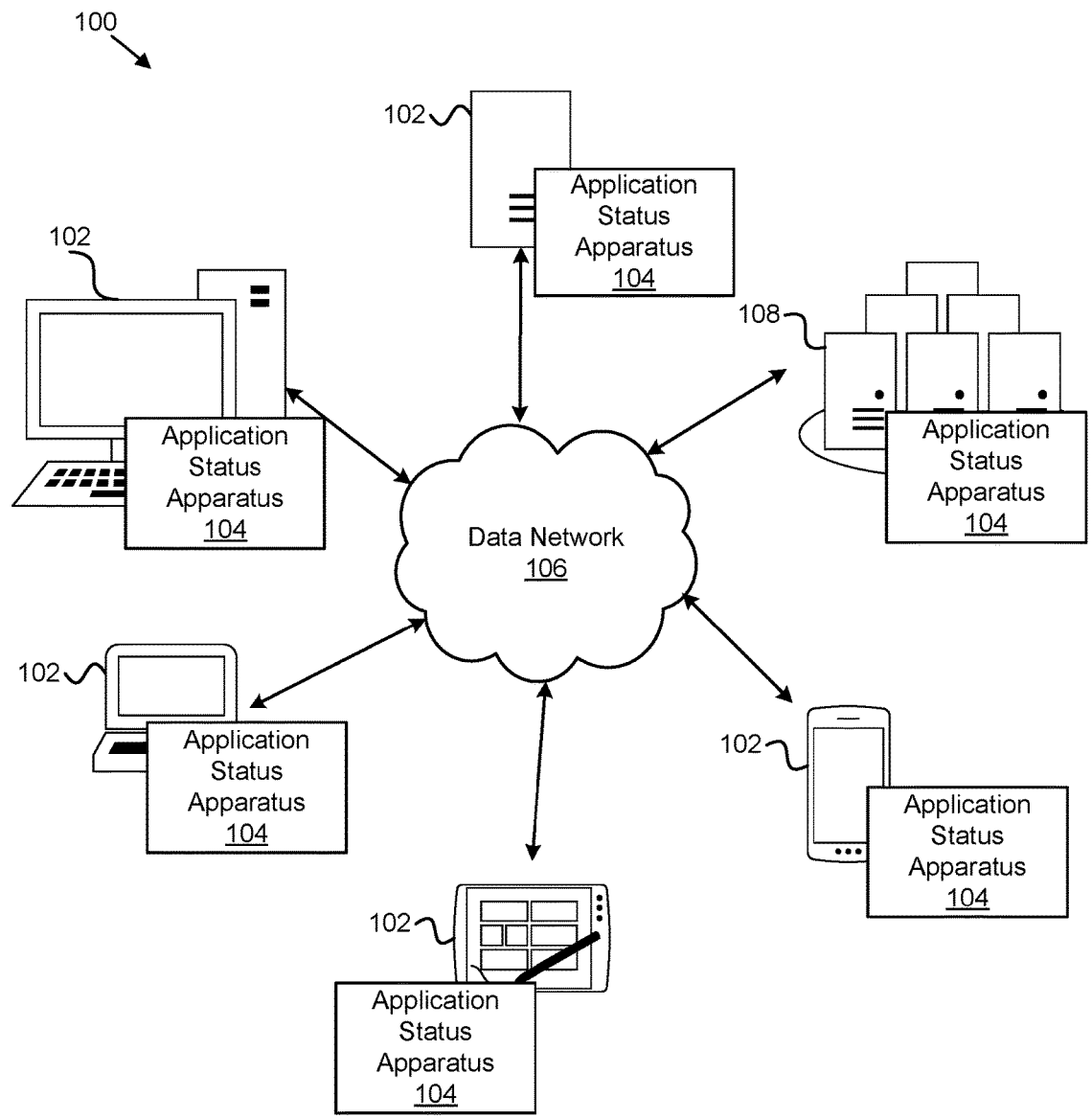
FIG. 1 is a schematic block diagram illustrating one embodiment of a system for indicating an application status based on a device state.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for indicating an application status based on a device state. In one embodiment, the system 100 includes one or more information handling devices 102, one or more application status apparatuses 104, one or more data networks 106, and one or more servers 108. In certain embodiments, even though a specific number of information handling devices 102, application status apparatuses 104, data networks 106, and servers 108 are depicted in FIG. 1, one of skill in the art will recognize, in light of this disclosure, that any number of information handling devices 102, application status apparatuses 104, data networks 106, and servers 108 may be included in the system 100.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupleable to one another and/or to one or more servers 108 over a data network 106, described below. The information handling devices 102, in a further embodiment, are capable of executing various firmware, programs, program code, applications, instructions, functions, and/or the like, and may access, store, download, upload, and/or the like data located on one or more servers 108. In some embodiments, the information handling devices 102 are configured to send and receive files from one or more different information handling devices 102, modify files, store files locally and/or in remote locations, and/or the like. The information handling devices 102 may include an electronic display, such as a touch screen display, and may present one or more graphical representations (e.g., icons) of applications, programs, or the like that are executable on an information handling device.

In one embodiment, the application status apparatus 104 is configured to determine one or more device resources that an application uses while executing on a device 102. The application status apparatus 104, in some embodiments, is configured to determine a performance state of each of the one or more device resources of the device 102. In a further embodiment, the application status apparatus 104 is configured to provide a visual indication of a potential execution level of the application on a display of the device 102. The potential execution level may describe a projected level of functionality of the application as a function of the performance state of the one or more device resources.

The application status apparatus 104, in one embodiment, improves the functioning of the computer and/or the computer technology in general, and improves the usability of the computer technology, by determining what resources an application needs to use when it is executed on a device 102, determining a current state of those resources, and visually indicating to a user whether the application can function at a full level, a partial level, or not at all, prior to the application being executed on the device 102. In this manner, a user can quickly determine whether an application is functional given a current state of the device 102 (e.g., if the device 102 is connected to a network, has a high CPU utilization, or the like) before the user attempts to execute the application. This may save the user time and frustration because the user can avoid running an application and waiting for the application to load only to discover that the application, or one or more features of the application, is not functional.

In various embodiments, the application status apparatus 104 may be embodied as a hardware appliance that can be installed or deployed on an information handling device 102, on a server 108, or elsewhere on the data network 106. In certain embodiments, an application status apparatus 104 may include a hardware device such as a secure hardware dongle or other hardware appliance device (e.g., a set-top box, a network appliance, or the like) that attaches to a device, a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the application status apparatus 104 may include a power interface, a wired and/or wireless network interface, a graphical interface that attaches to a display, and/or a semiconductor integrated circuit device as described below, configured to perform the functions described herein with regard to the application status apparatus 104.

The application status apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the application status apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the application status apparatus 104.

The semiconductor integrated circuit device or other hardware appliance of the application status apparatus 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the application status apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

While the application status apparatus 104 is shown as part of each information handling device 102 and server 108 in the system 100 depicted in FIG. 1, the application status apparatus 104 may be located, installed, or executed on one information handling device 102 or server 108, on a plurality of information handling devices 102 and servers 108, or the like. The application status apparatus 104, in another embodiment, may be installed on a server 108 and distributed to one or more information handling devices 102 such that portions of the application status apparatus 104 are located, installed, or executed on a plurality of information handling devices 102 and/or servers 108.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In certain embodiments, the one or more servers 108 store files such as text documents, spreadsheets, portable document format ("PDF") files, emails, audio files, video files, source code, and/or the like, which may be accessed by the application status apparatus 104. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
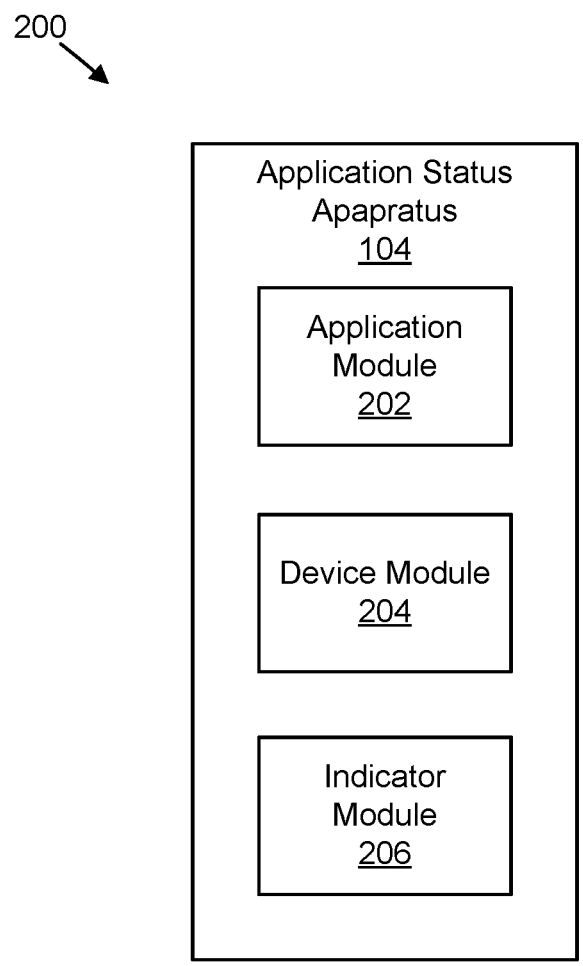
FIG. 2 is a schematic block diagram illustrating one embodiment of an apparatus for indicating an application status based on a device state.

FIG. 2 depicts one embodiment of an apparatus 200 for indicating an application status based on a device state. The apparatus 200 may include an embodiment of an application status apparatus 104. In one embodiment, the application status apparatus 104 includes one or more of an application module 202, a device module 204, and an indicator module 206, which are described in more detail below.

The application module 202, in one embodiment, is configured to determine one or more device resources that an application uses while executing on a device 102. As used herein, an application may be a program, a service, a script, an interface, a web page, and/or the like that is executable on a device 102. The one or more device resources that an application uses may include the device's battery, memory, storage, CPU/processor, network card, graphics card, sound card, display, camera, sensors (e.g., motion sensors, proximity sensors, or the like), and/or the like. For example, the application may be a multiplayer game that uses the device's battery, memory, storage, processor, network card, graphics card, sound mixer, and display while it is executing on the device 102.

In certain embodiments, the application module 202 determines one or more application execution metrics for each of the device resources used by the application. As used herein, an application execution metric may describe a utilization of a device resource by the application while the application executes on the device 102. In one embodiment, an application execution metric may include a battery consumption rate, a network utilization, a processor utilization, a memory utilization, a storage utilization, and/or the like.

For instance, the application module 202 may determine that an application, while executing, consumes X watts of or a percentage of battery power over a period of time (e.g., per second, per minute, per hour, etc.), uses X amounts of RAM, stores/deletes X amounts of data on a storage device (e.g., a hard disk drive) and/or transfers data to/from the a storage device at a certain rate, consumes X amounts of processor cycles or uses a percentage of the processor capacity over a period of time, utilizes X amounts of network bandwidth, or the like. The application execution metrics may be exact usage amounts for a period of time, average usage amounts calculated over a period of time, low usage amounts (e.g., usage amounts that satisfy a low usage threshold), high usage amounts (e.g., usage amounts that satisfy a high usage threshold), and/or the like.

For example, the application module 202 may determine that a social networking application consumes an average of 1% of the battery of the device 102 every 10 minutes, uses an average of 1.3 GB of RAM, uses 2.1 GB of RAM at its highest point, and 0.7 GB of RAM at its lowest point, stores 1 MB of data, and utilizes an average of 1000 kbps of network bandwidth while executing.

In one embodiment, the application module 202 determines the application execution metrics associated with an application by monitoring and tracking, over a period of time, one or more application execution metrics for a currently executing instance of the application on the device 102. For example, the application module 202 may monitor the application's utilization of the device's processor, network card, memory, battery, storage, etc. while the application is executing. The application module 202 may track the application execution metrics and store them in a file, database, or other data store to make accessible for future reference and use.

The application module 202, in a further embodiment, determines the application execution metrics associated with an application by checking a file, database, or other data store that includes application execution metrics for the application. In one embodiment, the application module 202 checks a file that the application module 202 previously created while monitoring and tracking the application execution metrics for the application.

In a further embodiment, the application module 202 checks a manifest file associated with the application. As used herein, a manifest file may be a file containing metadata, which may be located in multiple different files, describing the application. For example, the files of an application may have an associated manifest file describing the name, version number, and the files that constitute the program. Likewise, a manifest file for an application may include various application execution metrics for the application. The manifest file, for example, may be provided by the application's developer, designer, owner, distributor, tester, or the like, and may be based on benchmarking tests, or other types of tests, to determine various application execution metrics for the application. The manifest file, in some embodiments, may be an application manifest that is stored in an XML format, or other structured format.

In one embodiment, the application module 202 determines the application execution metrics associated with an application by checking an execution history of the application, which may be stored in a file, a database, and/or other data store. The execution history, in some embodiments, includes resource usage data for previously executed instances of the application over a period of time. The resource usage data may include raw usage data recorded at predefined intervals. For example, the resource usage data may include an applications processor utilization recorded every second. The resource usage data may include averages of the application's device resource usage over a period of time. The resource usage data may include outlier data, such as the highest utilizations for each device resource and the lowest utilizations for each device resource.

The execution history may include resource usage data for every instance of the application that was previously executed, resource usage data from only the most recent executed instances of the application (e.g., the previous five instances), resource usage data from a ransom selection of previously executed instances of the application, or the like. For example, the application module 202 may record resource usage data in the execution history every time an application is executed or may randomly select when resource usage data for an executing application is recorded.

In one embodiment, the application module 202 determines which device resources an application uses prior to the application being executed on the device 102. In one embodiment, the application module 202 may determine which applications are installed on the device 102, and/or otherwise executable on the device 102 (e.g., applications stored in the cloud or in another remote location and executable on the device 102), and, for each application, determine which resources the application may use and what the utilization rates of each resource may be for the application. The application module 202, for example, may check a manifest file, an execution history, or the like to determine the device resources each installed application uses and resource utilization rates for each application.

The device module 204, in one embodiment, is configured to determine a performance state of each of the one or more device resources of the device 102. A performance state, as used herein, may describe a current availability, capacity, utilization, or the like of the device's resources. In some embodiments, the performance state indicates whether a resource is available/unavailable, functional/partially functional/non-functional, active/inactive/partially active, or the like.

In some embodiments, the device module 204 determines a performance state of device resource by determining one or more performance metrics for the device resource. As used herein, a performance metric may describe a current utilization of a device resource on the device 102. For example, a performance metric for a utilization of a device's processor may be that the processor is at a 40% utilization rate, meaning that 60% of the processor is currently available for use, or it may be that a battery is 75% charged or has 3 hours of charge remaining based on the current workload of the device 102. Various factors may affect the utilization of a device's resources, such as processes running in the background, a type of network the device 102 is connected to, types of processes executing on the device 102 (e.g., graphics intensive processes, network intensive processes, or the like), and/or the like.

In certain embodiments, the performance metrics of the device 102 may include a battery level, a network utilization (e.g., a network bandwidth, latency, or the like), a processor utilization, a memory utilization, and a storage utilization. The device module 204 may periodically poll various device resources, such as a memory controller, a storage controller, a network interface controller, a power controller, a processor, an operating system, a firmware, and/or the like, to determine the current utilizations of the various resources.

The indicator module 206, in one embodiment, is configured to provide a visual indication of a potential execution level of an application on a display of a device 102. As used herein, a potential execution level of an application may describe a projected level of functionality of the application on the device 102 based on the performance state of the one or more device resources. The potential execution level, as described in more detail below regarding the execution module 302, may be a rating, flag, value, tag, or other indication that indicates whether the application is functional, non-functional, partially functional, (e.g., if the application cannot use the network, but other features of the application are available), or the like. For example, the potential execution level may be a value representing a measure of an application's projected functionality according to a functionality scale (e.g., a 1-10 scale where 1 is no functionality and 10 is full functionality).

The visual indication may be graphical representation of the application, one or more visual effects associated with the graphical representation of the application, or the like. In one example, the graphical representation is an icon used for launching the application. For example if the application module 202 determines that the application utilizes 35% of the processor while it is executing, but the device module 204 determines the processor currently only has 25% of its processing capacity available, the potential execution level of the application may be "unavailable," "low," "non-functional," or otherwise indicated as such using a value of a projected functionality scale (e.g., a 1 on a scale of 1-10), or the like to indicate that the application cannot be launched or executed with the current processor utilization, or may be executed but will be extremely slow or sluggish.

Based on the above example, the indicator module 206 may present a visual indication to the user that the application may not execute at full functionality if launched so that the user can make a decision whether to execute the application or not instead of executing the application only to find out that the application does not operate effectively due to the low processing capacity of the device 102.

In one embodiment, the visual indication of the potential execution level of an application includes hiding a graphical icon for launching the application in response to the potential execution level satisfying a low-functionality threshold. The low-functionality threshold, in one embodiment, may be a threshold where the application is substantially unusable, or one or more features of the application are substantially unusable, based on the resource utilizations of the device 102. The low-functionality threshold, for example, may be a value of 3 on a functionality scale of 1-10 such that a potential execution level of 3 or less will satisfy the threshold. The low-functionality threshold may be qualitative value such as anything below an "available" potential execution level.

For example, if a multiplayer application is installed on a device 102, but the network is unavailable or the device 102 is connected to a low bandwidth network, the potential execution level of the application may indicate that the projected functionality of the application is extremely limited due to the lack of network connectivity, and therefore satisfies the low-functionality threshold. Accordingly, the indicator module 206 may hide an icon representing the application from an interface of the device 102 by removing the icon from the display or by overlaying a graphic (e.g., a solid red box) over the icon.

In a further embodiment, the indicator module 206 is configured to present a graphical icon representing the application, but make the graphical icon not selectable by the user in response to the potential execution level satisfying a low-functionality threshold. For example, the indicator module 206 may "gray out" an icon representing the application such that the user can see that the application is available on the device 102, but that the application is currently unavailable and not selectable.

In one embodiment, the indicator module 206 is configured to set a color, line weight, style, or the like of a border of a graphical icon representing the application based on the potential execution level of the application. For example, if the potential execution level indicates that the application is functional/available to execute, the indicator module 206 may draw a green border around the icon representing the application. Otherwise, if the potential execution level indicates that the application is not functional/available, then the indicator module 206 may draw a red border around the icon representing the application.

In some embodiments, the indicator module 206 is configured to set a transparency level of a graphical icon representing the application based on the potential execution level of the application. For example, if the potential execution level for an application is 10 out 10, then the indicator module 206 would set the transparency level of an icon to 0 to indicate that the application is available at full projected functionality. Whereas, if the potential execution level of the application is a 5 out of 10, the indicator module 206 may set the transparency of the application at 50%, and so on.

In a further embodiment, the indicator module 206 is configured to present a tooltip associated with a graphical icon representing the application that includes information describing the potential execution level of the application. For example, the tooltip may show the potential execution level (e.g., 6 out of 10, 3 stars, or the like), and also any additional details regarding the application and/or the device resources that affect the application such as network availability information (e.g., whether the network is available or not, the network bandwidth, etc.), the processor utilization status, the battery life status, or the like.

In one embodiment, the indicator module 206 selects a plurality of visual indicators for the application, where each visual indicator corresponds to a level of availability of each of the device resources used by the application. In such an embodiment, the indicator module 206 presents each of the visual indicators simultaneously on the display. The indicator module 206 may overlay a scale using bars, dots, lines, stars, or the like, and the potential execution level's value on the scale that indicates an availability of each resource the application uses. For example, the indicator module 206 may overlay, or present adjacent to, an icon a line for each resource where a green line indicates the application can use the resource, and a red line indicating the application's projected functionality is limited by the resource.

For instance, the indicator module 206 may display lines corresponding to an overall potential execution level of the application, a battery life, a CPU utilization, and a network utilization over an icon representing a social media application. In this example, a red line for the network utilization would indicate that there are problems with the application's access to a network, and therefore the application's functionality will be limited. If the application can function with the current CPU and battery states, the lines representing these resources may be green, and the line representing the overall potential execution level of the application may be ⅔ green and ⅓ red to indicate that the application is mostly functional except for connecting to the network.

In some embodiments, the application module 202 assigns weights to each resource that an application uses based on how much the application relies on the resource. In such an embodiment, the application module 202 may determine which resources an application uses or is dependent on the most and may assign a higher weighting to these resources. For example, if an application is a graphically intense multiplayer game, the application module 202 may assign higher weights to the battery, network, processor, and graphical card resources of the device 102. The application module 202 may determine which resources the application uses, and the how much of the resources the application uses, according to a current execution of the application, an execution history for the application, a manifest file, or the like as described above.

Continuing with the previous example, because the application is a social media application, it's functionality may be highly dependent on connecting to a social media network over a network. Accordingly, if there is an issue with the application being able to connect to the network, the indicator module 206 may display the line representing the overall potential execution level of the application as 9/10 red and 1/10 green to indicate that the application's projected functionality is heavily hindered by the lack of network connectivity, but other functions of the application may be available.

In some embodiments, the indicator module 206 arranges a plurality of graphical icons representing applications according to the potential execution level of each application. For example, if the execution module 302 assigns each application a potential execution level between 1 and 10, the indicator module 206 may reassign the applications on the display in descending order of potential execution level such that the most functional applications are more visible/accessible than other applications. Similarly, the indicator module 206 may group applications into groups based on the potential execution levels of the applications. For example, the indicator module 206 may group "available" applications together, "partially available" application together, and "unavailable" applications together. The indicator module 206, in certain embodiments, orders a list of applications displayed on the device 102 in ascending order of potential execution level.

Figure 3:
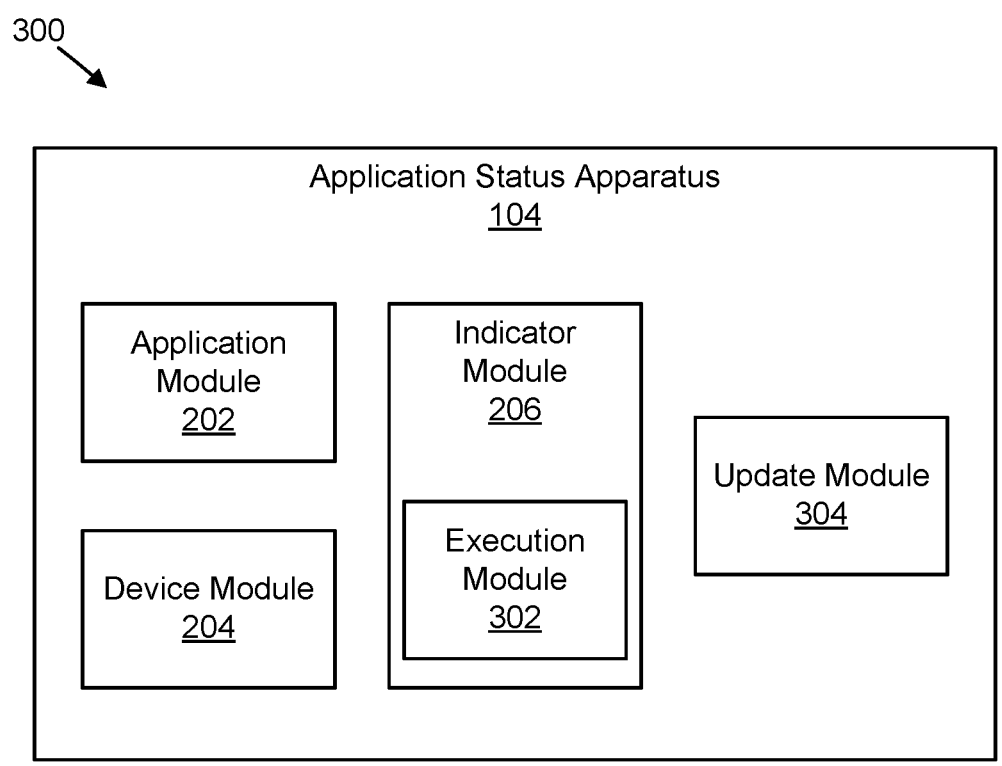
FIG. 3 is a schematic block diagram illustrating one embodiment of another apparatus for indicating an application status based on a device state.

FIG. 3 depicts one embodiment of an apparatus 300 for indicating an application status based on a device state. The apparatus 300, in one embodiment, includes an instance of an application status apparatus 104. The application status apparatus 104, in some embodiments, includes one or more of an application module 202, a device module 204, and an indicator module 206, which may be substantially similar to the application module 202, the device module 204, and the indicator module 206, described above with reference to FIG. 2. The application status apparatus 104, in a further embodiment, includes one or more of an execution module 302 and an update module 304, which are described in more detail below.

The indicator module 206, in one embodiment, includes an execution module 302 that determines a potential execution level of an application by comparing one or more application execution metrics for device resources that an application uses to one or more performance metrics for device resources on the device 102. As discussed above, the potential execution level of an application describes a projected level of functionality of the application on a device 102, or a level of impact/hindrance/limitation for an application based on the current resource utilization of a device 102. The potential execution level may describe an overall projected level of functionality of an application, and/or a projected level of functionality for various features of the application. The execution module 302, in certain embodiments, determines the potential execution level of an application prior to a user executing the application.

For example, the execution module 302 may compare a processor utilization rate of an application (as determined by the application module 202) to the current performance state of a device's processor (as determined by the device module 204) to determine whether the application can function given the current processor utilization. For instance, if the processor utilization rate for an application is 40%, but the device's processor is currently being utilized at 70%, then the processor state would limit whether the application can function on the device 102 and affect the potential execution level of the device 102.

In one embodiment, to determine the potential execution level of the application, the execution module 302 weighs each of the resources that the application uses equally. For example, if an application uses the processor, the network card, memory, storage, and the graphics card, the execution module 302 may weight each resource at 20% such that if the application execution metrics for one of the resources does not comply with the performance metric of a corresponding device resource, the execution module 302 may set the potential execution level for the application at 80%.

In some embodiments, the execution module 302 assigns different weights to each of the resources that the application uses based on the application execution metrics of the resources, as determined by the application module 202. For example, if an application utilizes the processor and network card more than the graphics card, memory, storage, or the like, then the processor and the network card may be assigned higher weights. Thus, if an application uses the network card and processor 50% more than memory, storage, and a graphics card, the execution module 302 may weigh each of the network card and processor 50% more than the other resources.

In some embodiments, the execution module 302 determines a potential execution level for an application on a per resource basis. For example, the execution module 302 may determine that the application has low projected functionality with regards to the network card, but high projected functionality with regards to the battery. In a similar example, the execution module 302 may set a potential execution level with regards to processor a rating of 7 out of 10 in response to the application execution metric for the processor being 10% greater than the current performance metric for the processor; however, if the application execution metric for the processor is 25% greater than the current performance metric for the processor, the execution module 302 may set the potential execution level to a 4 out of 10 to reflect the difference between the application's utilization of the processor and the current utilization of the processor on the device 102.

As described above, the execution module 302 may determine an overall potential execution level for the application based on the potential execution levels associated with each resource, e.g., the overall execution level may be an average of the potential execution levels for each resource. Furthermore, the indicator module 206 may provide a plurality of visual indicators for multiple resources that an application uses based on the potential execution levels of the resources so that a user can visually determine which of the resources may be a hindrance to the projected functionality of the application.

The potential execution level, in one embodiment, may be a rating, factor, value, flag, tag, or the like that describes the potential execution level of an application according to a predefined scale. For example, the execution module 302 may set a potential execution level as a value on a scale of 1-10, where 1 describes a low projected functionality of the application and 10 is full projected functionality of the application. Other values may be a number of stars (e.g., 4 out of 5 starts), a number of bars (e.g., 3 of 5 bars), a rating, or the like. In some embodiments, the potential execution level is represented by a tag such as available, functional, partially available, partially functional, unavailable, nonfunctional, or the like. Similarly, an application's projected functionality may be described as low, medium, high, or the like.

The update module 304, in one embodiment, is configured to periodically determine whether the potential execution level of an application has changed. For example, the update module 304 may check every minute, ten minutes, half hour, hour, or the like, to determine whether the potential execution level of an application has changed. In one embodiment, the update module 304 checks a previously determined potential execution level (e.g., the most recent potential execution level) for the application and compares it to a newly determined potential execution level.

In one embodiment, the update module 304 determines one or more new performance metrics for each of the one or more device resources of the device 102. In certain embodiments, the update module 304 uses, notifies, requests, triggers, or the like the device module 204 to determine the one or more new performance metrics. In a further embodiment, the update module 304 determines one or more new application execution metrics for each of the device resources used by the application. In some embodiments, the update module 304 uses, notifies, requests, triggers, or the like the application module 202 to determine the one or more new application execution metrics.

The update module 304, in one embodiment, compares the new performance metrics with the new application execution metrics to determine a new potential execution level for the application. In some embodiments, the update module 304 uses, notifies, requests, triggers, or the like the execution module 302 to determine the new potential execution level for the application. If the potential execution level is different, in some embodiments, the update module 304 may update the potential execution level and the indicator module 206 may then update the currently presented visual indicator to reflect the new potential execution level of the application.

For example, if the indicator module 206 displays the application's icon as available and then if the new potential execution level is less than the current potential execution level, the indicator module 206 may hide the application's icon, increase the icon's transparency, change a color of the icon's border, update a tooltip associated with the icon with the potential execution level information, inactivate the icon so that the user cannot select the icon, and/or the like.

Figure 4:
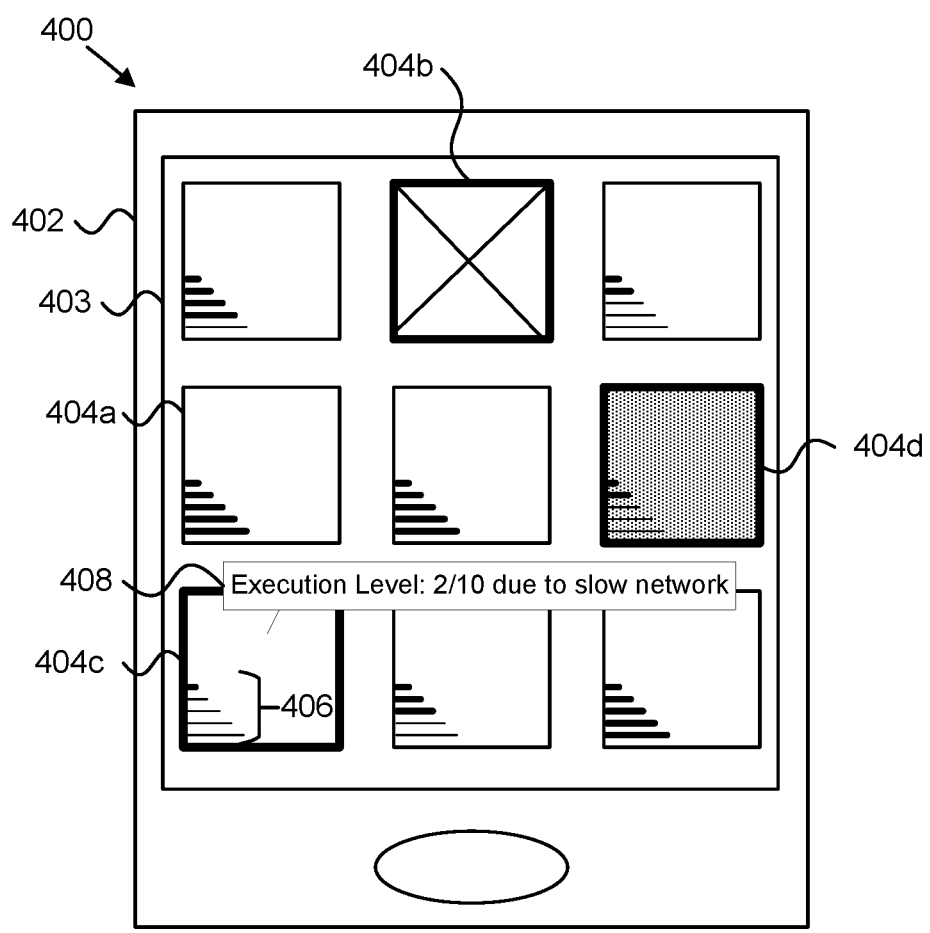
FIG. 4 depicts an embodiment of a device for indicating an application status based on a device state.

FIG. 4 depicts one embodiment of a device 400 for indicating an application status based on a device state. In one embodiment, the device 400 includes an embodiment of a smart phone 402, a tablet computer, a laptop computer, or the like. The smart phone 402 may include a touch display 403 that includes a plurality of graphical icons 404 that represent applications executable on the smart phone 402.

In one embodiment, for each application, and prior to an application being executed, the application module 202 determines one or more resources of the smart phone 402 that the application uses to while executing on the smart phone 402. The device module 204, in a further embodiment, determines a performance state of each of the device resources. The execution module 302 determines an execution state for each application, and the indicator module 206 provides a visual indication of the potential execution level for each application.

For example, the indicator module 206 may present one or more bars 406 on the icons 404 to indicate the potential execution level of the application represented by the icon. If the potential execution level of the application is high, full, or the like, then all of the bars may be bolded, colored, or the like on the application's icon 404a to indicate that the application is at full potential execution level, meaning that the current performance state of the device resources is not a hindrance to the functionality of the application.

If the potential execution level is less than a predetermined low-functionality threshold, then the indicator module 206 may present a visual indication to illustrate the lower potential execution level of the application. For instance, the indicator module 206 may change the color or line weight of the border of an icon 404b, 404c, 404d representing the application. In another example, the indicator module 206 may overlay a graphic on the icon 404b to indicate that the application is not currently functional due to the performance state of the smart phone's 402 devices.

In another example, the indicator module 206 may adjust a transparency of an icon 404d based on the potential execution level of the application and/or make the icon 404d appear inactive so that the icon 404d is not selectable. The lower the potential execution level, for example, the more transparent the icon may become. In a further example, the indicator module 206 may provide a tooltip 408 for an icon that provides information regarding the potential execution level of the application represented by the icon. In this manner, the application status apparatus 104 provides visual feedback to a user regarding the projected functionality of an application without requiring the user to load or execute the application just to find out that the application will not function correctly.

Figure 5:
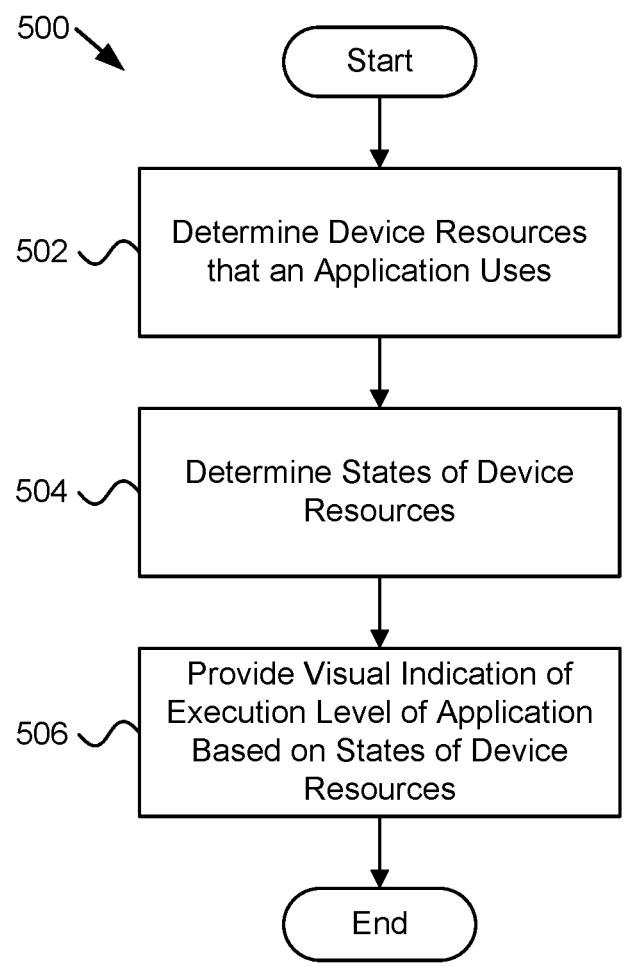
FIG. 5 is a schematic flow chart diagram illustrating one embodiment of a method for indicating an application status based on a device state.

FIG. 5 depicts a schematic flow chart diagram illustrating one embodiment of a method 500 for indicating an application status based on a device state. In one embodiment, the method 500 begins and determines 502 device resources that an application uses while executing on a device 102. In a further embodiment, the method 500 determines 504 a performance state of each of the device resources of the device 102. In some embodiments, the method 500 provides 506 a visual indication of a potential execution level of the application on a display of the device 102, and the method 500 ends. In certain embodiments, the application module 202, the device module 204, and the indicator module 206 perform the steps of the method 500.

Figure 6:
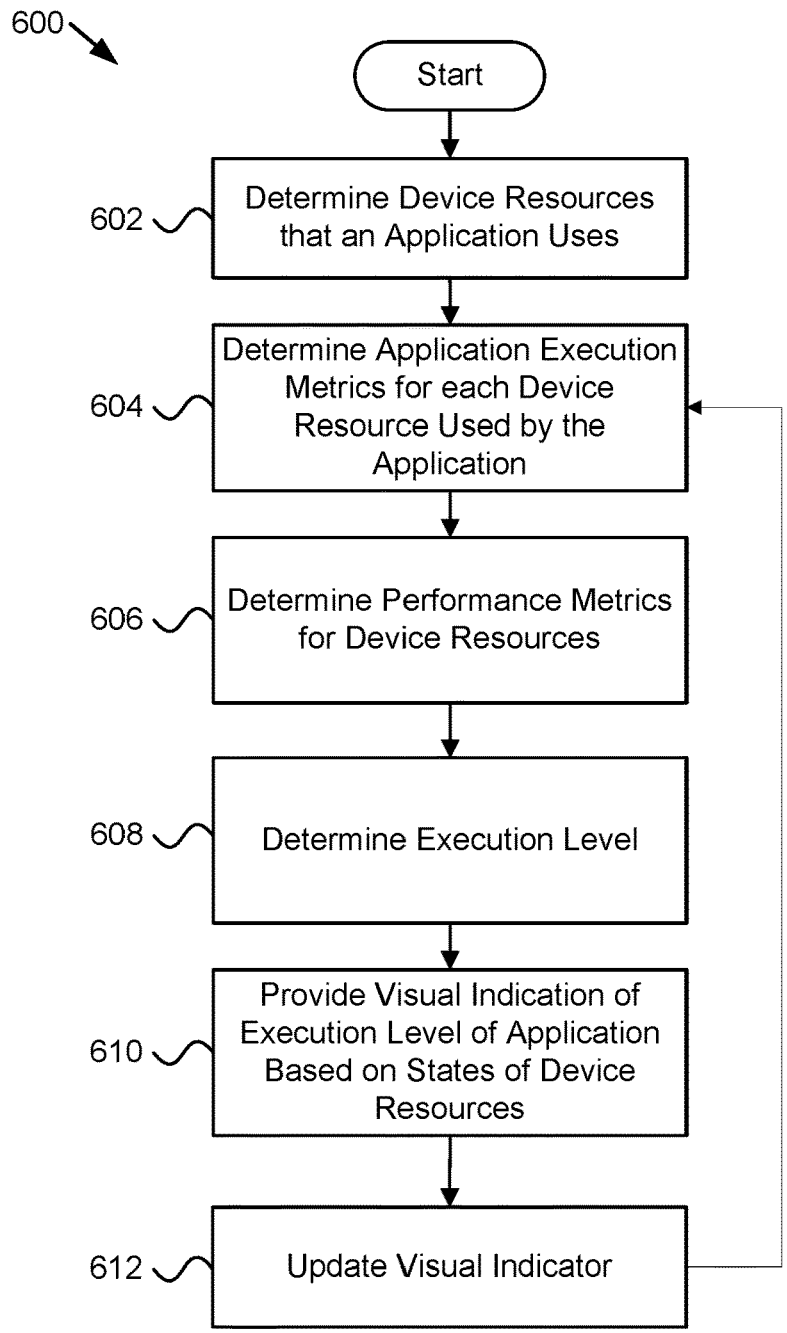
FIG. 6 is a schematic flow chart diagram illustrating one embodiment of another method for indicating an application status based on a device state.

FIG. 6 depicts a schematic flow chart diagram illustrating one embodiment of another method 600 for indicating an application status based on a device state. In one embodiment, the method 600 begins and determines 602 device resources that an application uses while executing on a device 102. In certain embodiments, the method 600 determines 604 application execution metrics associated with each device resource that the application uses while executing, such as a battery consumption, a processor utilization rate, and/or the like.

In one embodiment, the method 600 determines 606 performance metrics for each resource currently being used on the device 102, such as a remaining battery life, a current processor utilization, and/or the like. In certain embodiments, the method 600 determines 608 a potential execution level of the application based on a comparison of the application execution metrics and the performance metrics to determine a projected functionality of the application given the current state of the device resources.

In a further embodiment, the method 600 provides 610 a visual indication of the potential execution level of the application on a display of the device 102 such as hiding an icon, changing a transparency of an icon, displaying a graphic over the icon, displaying a tooltip, or the like that indicates the potential execution level of the application. The method 600, in some embodiments, periodically updates 612 the visual indicator by determining whether the potential execution level of the application has changed by determining 604 new application execution metrics, determining 606 new performance metrics, and so on. In certain embodiments, the application module 202, the device module 204, the indicator module 206, the execution module 302, and the update module 304 perform the steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising modules, the modules embodied as one or more of hardware circuits, programmable hardware devices, and a processor executing code, the apparatus comprising:

an application module that monitors and tracks, over a period of time, one or more application execution metrics of an application while it executes on a device, the application execution metrics indicating an amount of one or more device resources of the device that the application uses while executing on the device;

a device module that determines one or more performance metrics for each of the one or more device resources of the device, a performance metric describing a current utilization of a device resource on the device;

an indicator module that provides a visual indication of a potential execution level of the application on a display of the device, the potential execution level describing a projected level of functionality of the application based on the one or more performance metrics of the device and the application execution metrics of the application, the visual indication presented as part of a graphical representation of the application presented on the display, the graphical representation selectable to execute the application; and an update module that periodically determines whether the potential execution level of the application has changed by:

determining one or more new performance metrics for each of the one or more device resources of the device;

determining one or more new application execution metrics for each of the device resources of the device used by the application; and comparing the one or more new performance metrics for each of the one or more device resources of the device to the one or more application execution metrics of the application to determine whether the potential execution level is different from a previously determined potential execution level, the indicator module updating the visual indication of the potential execution level in response to the potential execution level being different.

2. The apparatus of claim 1, wherein the indicator module further comprises an execution module that determines the potential execution level of the application by comparing the one or more performance metrics for each of the one or more device resources of the device to the one or more application execution metrics of the application to determine whether a device resource of the device is available for use by the application.

3. The apparatus of claim 2, wherein the execution module determines the potential execution level of the application prior to the application being executed on the device.

4. The apparatus of claim 1, wherein the application module determines the one or more application execution metrics by checking a file comprising the one or more application execution metrics, the file comprising a manifest file associated with the application, the manifest file created by one or more of an owner and a developer of the application.

5. The apparatus of claim 1, wherein the application module determines the one or more application execution metrics by checking an execution history of the application, the execution history comprising one or more application execution metrics from previously executed instances of the application.

6. The apparatus of claim 1, wherein the one or more application execution metrics of the application comprise one or more of:
a battery consumption rate;
a network utilization;
a processor utilization;
a memory utilization; and
a storage utilization.

7. The apparatus of claim 1, wherein the one or more performance metrics of the device comprise one or more of:
a battery level;
a network utilization;
a processor utilization;
a memory utilization; and
a storage utilization.

8. The apparatus of claim 1, wherein the indicator module selects a plurality of visual indications for the application that correspond to a level of availability of each of the device resources of the device used by the application, wherein each of the plurality of visual indications are displayed simultaneously on the display of the device.

9. The apparatus of claim 1, wherein providing the visual indication comprises one or more of:
hiding a graphical icon representing the application in response to the potential execution level satisfying a low-functionality threshold;
presenting a graphical icon representing the application that is not selectable in response to the potential execution level satisfying the low-functionality threshold;
setting a color of a border of a graphical icon representing the application as a function of the potential execution level of the application;
setting a transparency level of a graphical icon representing the application based on the potential execution level of the application; and
presenting a tooltip associated with a graphical icon representing the application, the tooltip comprising information describing the potential execution level of the application.

10. A method comprising:
monitoring and tracking, by use of a processor over a period of time, one or more application execution metrics of an application while it executes on a device, the application execution metrics indicating an amount of one or more device resources of the device that the application uses while executing on the device;
determining one or more performance metrics for each of the one or more device resources of the device, a performance metric describing a current utilization of a device resource on the device;
providing a visual indication of a potential execution level of the application on a display of the device, the potential execution level describing a projected level of functionality of the application based on the one or more performance metrics of the device and the application execution metrics of the application, the visual indication presented as part of a graphical representation of the application presented on the display, the graphical representation selectable to execute the application; and
periodically determining whether the potential execution level of the application has changed by:
determining one or more new performance metrics for each of the one or more device resources of the device;
determining one or more new application execution metrics for each of the device resources of the device used by the application; and
comparing the one or more new performance metrics for each of the one or more device resources of the device to the one or more application execution metrics of the application to determine whether the potential execution level is different from a previously determined potential execution level, the visual indication of the potential execution level updated in response to the potential execution level being different.

11. The method of claim 10, further comprising determining the potential execution level of the application by comparing the one or more performance metrics for each of the one or more device resources of the device to the one or more application execution metrics of the application to determine whether a device resource of the device is available for use by the application.

12. The method of claim 10, further comprising determining the one or more application execution metrics by checking a file comprising the one or more application execution metrics, the file comprising a manifest file associated with the application, the manifest file created by one or more of an owner and a developer of the application.

13. The method of claim 10, further comprising determining the one or more application execution metrics by checking an execution history of the application, the execution history comprising one or more application execution metrics from previously executed instances of the application.

14. The method of claim 10, wherein providing the visual indication comprises one or more of:
- hiding a graphical icon representing the application in response to the potential execution level satisfying a low-functionality threshold;
- presenting a graphical icon representing the application that is not selectable in response to the potential execution level satisfying the low-functionality threshold;
- setting a color of a border of a graphical icon representing the application as a function of the potential execution level of the application;
- setting a transparency of a graphical icon representing the application, a level of the transparency being selected as a function of the potential execution level of the application; and
- presenting a tooltip associated with a graphical icon representing the application, the tooltip comprising information describing the potential execution level of the application.

15. A program product comprising a non-transitory computer readable storage medium that stores code executable by a processor, the executable code comprising code to perform:
- monitoring and tracking, by use of a processor over a period of time, one or more application execution metrics of an application while it executes on a device, the application execution metrics indicating an amount of one or more device resources of the device that the application uses while executing on the device;
- determining one or more performance metrics for each of the one or more device resources of the device, a performance metric describing a current utilization of a device resource on the device;
- providing a visual indication of a potential execution level of the application on a display of the device, the potential execution level describing a projected level of functionality of the application based on the one or more performance metrics of the device and the application execution metrics of the application, the visual indication presented as part of a graphical representation of the application presented on the display, the graphical representation selectable to execute the application; and
- periodically determining whether the potential execution level of the application has changed by:
  - determining one or more new performance metrics for each of the one or more device resources of the device;
  - determining one or more new application execution metrics for each of the device resources of the device used by the application; and
  - comparing the one or more new performance metrics for each of the one or more device resources of the device to the one or more application execution metrics of the application to determine whether the potential execution level is different from a previously determined potential execution level, the visual indication of the potential execution level updated in response to the potential execution level being different.

* * * * *